US012637931B2

(12) United States Patent
Debenedictis et al.

(10) Patent No.: US 12,637,931 B2
(45) Date of Patent: May 26, 2026

(54) METHOD FOR GENERATING CO2 IN SITU FOR OILFIELD APPLICATIONS USING PROPYLENE CARBONATE

(71) Applicant: Baker Hughes Oilfield Operations LLC, Houston, TX (US)

(72) Inventors: Frances Debenedictis, Houston, TX (US); Justin Porter, Katy, TX (US); Lirio Quintero, Houston, TX (US); Naima Bestaoui-Spurr, The Woodlands, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 18/626,253

(22) Filed: Apr. 3, 2024

(65) Prior Publication Data

US 2025/0314161 A1     Oct. 9, 2025

(51) Int. Cl.
　　*E21B 43/16* 　　　(2006.01)
　　*C09K 8/594* 　　　(2006.01)

(52) U.S. Cl.
　　CPC ............ *E21B 43/164* (2013.01); *C09K 8/594* (2013.01); *C09K 2208/10* (2013.01)

(58) Field of Classification Search
　　CPC ...... E21B 43/16; E21B 43/162; E21B 43/164; E21B 43/166; E21B 43/168; C09K 8/58; C09K 8/592; C09K 8/594; C09K 2208/10
　　See application file for complete search history.

(56) References Cited

U.S. PATENT DOCUMENTS

| | | | | |
|---|---|---|---|---|
| 2,727,027 A | * | 12/1955 | Monson et al. | C07C 69/96 530/367 |
| 3,248,414 A | * | 4/1966 | Stevens | C08G 18/44 558/266 |
| 4,043,830 A | * | 8/1977 | Suzuki | C04B 28/26 106/900 |
| 4,267,120 A | * | 5/1981 | Cuscurida | C08G 63/64 528/80 |
| 4,634,743 A | * | 1/1987 | Prier | C08G 18/44 525/394 |
| 4,861,909 A | * | 8/1989 | Harris | C08G 18/44 528/370 |
| 4,906,672 A | * | 3/1990 | Stone | C08J 9/122 264/50 |
| 4,927,551 A | * | 5/1990 | Erdman | C10M 145/14 508/291 |
| 4,959,499 A | * | 9/1990 | Harris | C08G 71/02 528/196 |
| 5,336,315 A | * | 8/1994 | Cuscurida | C04B 28/26 166/266 |
| 7,838,056 B2 | * | 11/2010 | Forgac | B01F 23/2361 426/477 |
| 8,273,426 B1 | | 9/2012 | Laramay et al. | |
| 10,961,444 B1 | | 3/2021 | Bestaoui-Spurr et al. | |
| 2011/0257284 A1 | * | 10/2011 | Bruchmann | C08G 18/632 521/137 |
| 2022/0154562 A1 | | 5/2022 | Alyousif et al. | |
| 2023/0313645 A1 | | 10/2023 | Al-Qasim | |
| 2023/0416487 A1 | * | 12/2023 | Detrembleur | C08G 71/04 |

FOREIGN PATENT DOCUMENTS

| | | | | | |
|---|---|---|---|---|---|
| JP | | S 5793976 A | * | 6/1982 | Y02P 20/52 |
| WO | | WO-9719972 A1 | * | 6/1997 | C08L 63/00 |
| WO | | 2014056949 A2 | | 4/2014 | |
| WO | | 2016140662 A1 | | 9/2016 | |
| WO | | WO-2016188774 A1 | * | 12/2016 | C09K 8/44 |

OTHER PUBLICATIONS

ALFA Chemistry, What is a Molecular Sieve, retrieved Feb. 25, 2025 from https://www.alfa-chemistry.com/resources/what-is-a-molecular-sieve.html (Year: NA).*
Machine translation of JPS 5793976 (A) (Year: 1982).*
Lyondellbasell, "Technical Data: Propylene Carbonate", LyondellBasell Industries Holdings, B.V. 2011.
T. Fujinaga and K. Izutsu, "Propylene Carbonate: Purification and Tests for Purity", International Union of Pure and Applied Chemistry; 1971, 273-280.
Murugan, C. et al., Transesterification of propylene carbonate with methanol using Mg-A1-CO3 hydrotalcite as solid base catalyst', Indian Journal of Chemistry, Sep. 2010, vol. 49A, pp. 1182-1188.
International Search Report and Written Opinion for PCT/US2025/022972 mailed Jul. 15, 2025.

* cited by examiner

*Primary Examiner* — Angela M DiTrani Leff
(74) *Attorney, Agent, or Firm* — Crowe & Dunlevy, P.C.

(57) ABSTRACT

A method for generating CO2 in situ for oilfield applications involves introducing propylene carbonate into a target zone and introducing a catalyst into the target zone, where the catalyst decomposes the propylene carbonate at the target zone to produce the CO2. The CO2 is subsequently used for a desired treatment objective or chemical reaction. The steps of introducing the propylene carbonate and the catalyst into the target zone occur in any order or simultaneously.

21 Claims, No Drawings

METHOD FOR GENERATING CO2 IN SITU FOR OILFIELD APPLICATIONS USING PROPYLENE CARBONATE

FIELD OF THE INVENTION

This invention generally relates to CO2 production and, more particularly, but not by way of limitation, to a method for generating CO2 in situ for oilfield applications using propylene carbonate.

BACKGROUND OF THE INVENTION

Carbon dioxide is used in many oilfield applications, from generating foams for drilling to cementing, fracturing and acid stimulation treatments, and enhanced oil recovery (EOR). Although the cost to purchase liquid carbon dioxide (CO2) is relatively low, the transportation costs and Health, Safety and Environment (HSE) risks are high.

Propylene carbonate is an environmentally friendly solvent available for various oilfield applications. The primary decomposition products of propylene carbonate include propylene glycol oxide, propionaldehyde, allyl alcohol and CO2. Using propylene carbonate as an in-situ source of CO2 could reduce the HSE risks and other challenges related to transporting CO2 to the location where it is intended to be used. Some studies have attempted the conversion of propylene carbonate to CO2 at bottom hole temperature (BHT) and bottom hole pressure (BHP) through natural degradation processes. These studies have been generally unsuccessful due to the stability of propylene carbonate at higher temperatures (up to about 250° C.).

A need exists, therefore, for effective methods to convert propylene carbonate to CO2 at high temperatures, such as those experienced under bottom hole conditions. The present disclosure is directed at these and other deficiencies in the prior art.

SUMMARY OF THE INVENTION

In some embodiments, the present disclosure is directed at a method for generating CO2 in situ for oilfield applications. The method involves introducing propylene carbonate into a target zone and introducing a catalyst into the target zone, where the catalyst decomposes the propylene carbonate at the target zone to produce the CO2. The CO2 is subsequently used for a desired treatment objective or chemical reaction. The steps of introducing the propylene carbonate and the catalyst into the target zone occur in any order or simultaneously.

In other embodiments, the present disclosure is directed to a method of generating CO2 in situ for treatment objectives, where the method includes the steps of adsorbing a catalyst onto an adsorbent matrix to create a catalyst-loaded matrix, introducing propylene carbonate into a target zone, and introducing the catalyst-loaded matrix into the target zone where the catalyst desorbs from the catalyst-loaded matrix to decompose the propylene carbonate at the target zone to produce the CO2. The CO2 can then be used for the desired treatment objective.

In yet other embodiments, the present disclosure is directed to a treatment package for generating CO2 in situ for a treatment objective. The treatment package includes a volume of propylene carbonate, a volume of a first catalyst, and a volume of a second catalyst. In these embodiments, the first catalyst is a metal oxide or a metal nanoparticle and the second catalyst is an acid or base.

DETAILED DESCRIPTION

It has been discovered that combining propylene carbonate with certain catalysts decomposes the propylene carbonate to CO2 at temperatures where the propylene carbonate would typically be stable. By selectively contacting propylene carbonate with a catalyst (e.g., through a delayed release mechanism), CO2 can be generated in situ for various reactions and treatment objectives within the oilfield, including but not limited to, cementing, fracturing, performing acid stimulation treatments, generating foams for drilling, and conducting EOR operations to increase production.

Based on the foregoing, a method for generating CO2 in situ for oilfield applications involves introducing propylene carbonate and a catalyst into a target zone, where the catalyst reacts with and decomposes the propylene carbonate to produce the CO2. The CO2 can then be used to perform a desired treatment objective or chemical reaction.

The propylene carbonate and the catalyst can be introduced into the target zone in any order or simultaneously. In one embodiment, the propylene carbonate is introduced into the target zone before the catalyst. In another embodiment, the propylene carbonate is introduced after the catalyst is introduced into the target zone. Multiple alternating volumes of propylene carbonate and catalyst can also be used to generate CO2. For example, one embodiment introduces a first volume of propylene carbonate into the target zone, followed by a first volume of catalyst, a second volume of propylene carbonate, and a second volume of catalyst in series. In another embodiment, a first volume of catalyst is introduced into the target zone, followed by a first volume of propylene carbonate, a second volume of catalyst, and a second volume of propylene carbonate in series. It will be appreciated that the first and second volumes of propylene carbonate treatments may have either the same or different concentrations of propylene carbonate. Similarly, the first and second volumes of treatments can include the same or different concentrations of the catalyst, or different catalysts altogether. In various embodiments, 1, 2, 3, 4, 5, 6, 7, 8, 9, 10, 11 or 12 volumes of propylene carbonate are alternated with corresponding volumes of the catalyst or catalysts. In some embodiments, alternating or simultaneous volumes of propylene carbonate and of the catalyst are introduced continuously into the target zone. In other embodiments, volumes of propylene carbonate and of the catalyst are repetitively introduced to the target zone based on present need or at a pre-determined interval of time (e.g., ten minutes, thirty minutes, an hour, twenty-four hours, a week, etc.).

In other embodiments, the propylene carbonate and the catalyst are introduced into the target zone as a single formulation.

In general, the target zone has a temperature of about 400° C. or less than about 400° C. In certain non-limiting embodiments, the target zone has a temperature of about 250° C. or less than about 250° C. In various embodiments, the target zone is at a wellbore, the near-wellbore region, or a formation, where suitable target zones include but are not necessarily limited to a wellbore tubular, a wellhead, production tubing, or downhole equipment. Other suitable target zones include process equipment, a process tank and conduit, a pipeline, or a storage tank.

The catalyst may be a solid, a liquid, or a combination thereof. In certain embodiments where the catalyst is a solid, it can be dissolved in a suitable solvent, thus making it a liquid catalyst. In other embodiments where the catalyst is a solid, the catalyst is disposed on a high-surface-area solid, such as a molecular sieve, diatomaceous earth, zeolite, high-surface-area metal composite, high-surface-area organic polymer on a composite, high-surface-area silica or alumina silicate, or a metal-organic framework material.

Suitable catalysts include metal oxides and metal nanoparticles, such as platinum-based nanoparticles, nickel-based nanoparticles, copper-based nanoparticles, cobalt-based nanoparticles, gold-based nanoparticles, and palladium-based nanoparticles. The catalysts can also include acids, bases, salts, and combinations thereof. Suitable acids include hydrochloric acid, citric acid, acetic acid, formic acid, dodecyl benzene sulfonic acid, succinic acid, adipic acid, glutaric acid, and mixtures thereof. Suitable bases include sodium hydroxide, potassium hydroxide, sodium carbonate, sodium bicarbonate, ammonia, sodium hypochlorite, monoethanolamine, diethanolamine, and mixtures thereof. In various embodiments, the salt is potassium chloride, sodium chloride, ammonium chloride, sodium bromide, cobalt acetate, quaternary ammonium salt, phosphonium salt, or a mixture thereof.

In one embodiment, the propylene carbonate and the catalyst are injected into the target zone in a ratio of between about 99.999:0.001 and about 50:50 (propylene carbonate: catalyst). In another embodiment, the ratio of propylene carbonate to catalyst injected into the target zone is between about 99.99:0.01 and about 94:6.

The propylene carbonate, the catalyst, or both can be injected to the target zone in a concentrated form. For formation and wellbore applications, the concentrated form can be applied to the impacted region by stimulation methods such as bullheading, coiled tubing, injection through capillary tubing, chemical injection plunger, or other treatment chemical delivery mechanisms. For application to surface-based equipment or facilities, the propylene carbonate or catalyst can be applied by pumping, spraying, soaking, or otherwise contacting the equipment/facilities with the concentrated form.

Alternatively, the propylene carbonate, the catalyst, or both can be mixed with a suitable carrier fluid and pumped into the wellbore or through surface-based facilities and equipment. The carrier fluid may be water, brine, or another aqueous solution. In general, the propylene carbonate may be mixed into the carrier fluid in any proportion. In some embodiments, the catalyst is mixed into the carrier fluid in a concentration range of between about 1 ppm and about 500,000 ppm (catalyst to carrier fluid). In other embodiments, the concentration range is between about 1 ppm and about 6,000 ppm.

One or more delayed release mechanisms may be used to delay degradation of the propylene carbonate by the catalyst until both reach the target zone. In one embodiment, the catalyst is loaded or immobilized onto a surface of a support matrix or within one or more pores of a porous or high surface area support. For example, the catalyst may be adsorbed onto an adsorbent matrix, such as a water-insoluble substrate, an oil-insoluble substrate, or an adsorbent substrate that is both water and oil-insoluble. A portion of the catalyst may further be absorbed into interstitial spaces of the support.

After arrival at the target zone, the catalyst is released (or desorbed) from the support over time. Release of the catalyst into the target zone may be controlled by the presence of a coating. The coating may be applied by low temperature curing methods as well as indirect heating processes. In one embodiment, at least a portion of the surface of the support or porous support is covered with a coating that includes an organic polymer or inorganic material.

The organic polymer may be cured, partially cured, or uncured. Suitable organic polymers include thermoplastics as well as thermosetting resins. Exemplary thermoplastics include polyethylene, acrylonitrile-butadiene styrene, polystyrene, polyvinyl chloride, fluoroplastics, polysulfide, polypropylene, styrene acrylonitrile, nylon, and phenylene oxide. Exemplary thermosetting resins include epoxy resins, phenolic resins, melamine formaldehyde resins, polyester resins, polyurethanes, epoxy-modified phenolic resin, and derivatives thereof. The organic polymer may be cross-linked.

Suitable inorganic materials include inorganic compounds such as those containing metal. In a preferred embodiment, the metal is zirconium or zinc. Exemplary inorganic materials include zirconium silicate as well as zinc silicate.

The coating typically ensures the catalyst is not released until elevated stress levels are reached. To release the catalyst at the target zone, at least one crack or fissure is created in the coating. Release of the catalyst from the support through the crack(s) or fissure(s) may occur when an applied stress exceeds the maximum stress and crush resistance that the coating can withstand before showing some cracks. In one embodiment, mechanical stress is applied to the support to create the desired crack(s) or fissure(s). Mechanical stress is achieved in various embodiments by slickwater fracturing, hydraulic fracturing, acid fracturing, or frac packing. In another embodiment, the coating is configured to develop the at least one crack or fissure when it is heated within the target zone and reaches a release temperature.

The catalyst is released from the support or porous support, passes through the at least one crack or fissure created in the coating, and becomes exposed within the target zone, where the catalyst reacts with and decomposes the propylene carbonate to $CO_2$. In one embodiment, the $CO_2$ is used to perform a desired treatment objective or chemical reaction within the target zone. In another embodiment, the $CO_2$ is recovered from the target zone and used elsewhere for the desired treatment objective or chemical reaction. The desired treatment objective or chemical reaction may be related to cementing, fracturing, performing acid stimulation treatments, generating foams for drilling, or conducting EOR operations (e.g., gas huff-and-puff, continuous injection). For example, in one embodiment, the $CO_2$ is contacted with a surfactant to generate foam for enhanced oil recovery. In various embodiments, the surfactant is injected into the target zone before, during, or after the injection of propylene carbonate.

In some embodiments, the combination of the propylene carbonate and one or more catalysts together presents a treatment package that can be used for generating $CO_2$ in situ for one or more treatment objectives. The treatment package can include a plurality of catalysts selected from those disclosed herein, including metal oxides, metal nanoparticles, acids, bases, and salts.

EXAMPLES

The method for generating $CO_2$ in situ for oilfield applications using propylene carbonate is further illustrated by the following examples, which are provided for the purpose of demonstration rather than limitation.

Example 1

In a first round of tests, propylene carbonate was combined with various solvents, and it was observed that certain samples decomposed and generated CO2. More particularly, it was determined that an aqueous solution of propylene carbonate in the presence of acids, bases, metal oxides, or salts caused the decomposition of the propylene carbonate to gas, with the rate of decomposition generally increasing with increasing temperature. The primary decomposition products of propylene carbonate included propylene glycol oxide, propionaldehyde, allyl alcohol and carbon dioxide.

Table 1 demonstrates various sourced samples of 90 wt. % propylene carbonate (PC) and 10 wt. % water from different sources formulated in acidic, basic, and neutral solutions. Samples 1, 4, and 7 were formulated with a drop of dodecyl benzene sulfonic acid (DDBSA). Samples 2, 5, and 8 were neutral formulations. Samples 3, 6, and 9 were formulated with a drop of 5% sodium hydroxide.

TABLE 1

| Sample No. | PC Sample 1 (g) | PC Sample 2 (g) | PC Sample 3 (g) | Water (g) | DDBSA (drops) | 5% NaOH (drops) |
|---|---|---|---|---|---|---|
| 1 | 9 | | | 1 | 1 | |
| 2 | 9 | | | 1 | | |
| 3 | 9 | | | 1 | | 1 |
| 4 | | 9 | | 1 | 1 | |
| 5 | | 9 | | 1 | | |
| 6 | | 9 | | 1 | | 1 |
| 7 | | | 9 | 1 | 1 | |
| 8 | | | 9 | 1 | | |
| 9 | | | 9 | 1 | | 1 |

Sound was used to determine gas production in each of Samples 1-9 because the gas could not be visualized. As shown in Table 2, it was determined that the acidic and basic solutions produced gas after 24 hours of incubation at 50° C., while the neutral solutions did not.

TABLE 2

| Sample No. | Results observed after 24 hours at 50° C. | pH Description |
|---|---|---|
| 1 | Pressure sound, but no visible foaming | Acidic |
| 2 | No pressure sound | Neutral |
| 3 | Pressure sound, but no visible foaming | Basic |
| 4 | Pressure sound, but no visible foaming | Acidic |
| 5 | No pressure sound | Neutral |
| 6 | Pressure sound, but no visible foaming | Basic |
| 7 | Pressure sound, but no visible foaming | Acidic |
| 8 | No pressure sound | Neutral |
| 9 | Pressure sound, but no visible foaming | Basic |

In summary, the performed tests indicated that the acidic and basic solutions decomposed propylene carbonate to gas, where the decomposition products included CO2.

In the foregoing specification, the invention has been described with reference to specific embodiments thereof. However, it will be evident that various modifications and changes can be made thereto without departing from the broader scope of the invention as set forth in the appended claims. Accordingly, the specification is to be regarded in an illustrative rather than a restrictive sense. For example, catalysts, target zones, coatings, supports, porous supports, mechanical stresses, treatment procedures, proportions, dosages, temperatures, and amounts not specifically identified or described in this disclosure or not evaluated in a particular Example are still expected to be within the scope of this invention.

The present invention may suitably comprise, consist of, or consist essentially of the elements disclosed and may be practiced in the absence of an element not disclosed. As used herein, the singular forms "a," "an," and "the" are intended to include the plural forms as well, unless the context clearly indicates otherwise. As used herein, the term "about" in reference to a given parameter is inclusive of the stated value and has the meaning dictated by the context (e.g., it includes the degree of error associated with measurement of the given parameter). As used herein, the term "and/or" includes any and all combinations of one or more of the associated listed items.

It is claimed:

1. A method of generating $CO_2$ gas in situ for a treatment objective, the method comprising:

introducing propylene carbonate into a target zone, wherein the target zone is selected from the group consisting of a wellbore, a near-wellbore region, and a formation;

introducing a catalyst into the target zone, wherein the catalyst decomposes the propylene carbonate at the target zone to produce the $CO_2$ gas; and contacting the $CO_2$ gas with a surfactant to generate a foam within the target zone for performing the treatment objective, wherein the step of introducing the propylene carbonate into the target zone and the step of introducing the catalyst into the target zone occur in any order or simultaneously.

2. The method of claim 1, wherein the step of introducing the propylene carbonate into the target zone is performed before the step of introducing the catalyst into the target zone.

3. The method of claim 1, wherein the step of introducing the propylene carbonate into the target zone is performed after the step of introducing the catalyst into the target zone.

4. The method of claim 1, wherein the step of introducing the propylene carbonate into the target zone further comprises:

introducing a first volume of propylene carbonate into the target zone, and introducing a second volume of propylene carbonate into the target zone.

5. The method of claim 4, wherein the step of introducing the catalyst into the target zone further comprises:

introducing a first volume of catalyst into the target zone after the step of introducing the first volume of propylene carbonate into the target zone; and introducing a second volume of catalyst into the target zone after the step of introducing the second volume of propylene carbonate into the target zone.

6. The method of claim 4, wherein the step of introducing the catalyst into the target zone further comprises the steps of:

introducing a first volume of catalyst into the target zone before the step of introducing the first volume of propylene carbonate into the target zone; and introducing a second volume of catalyst into the target zone before the step of the second volume of propylene carbonate into the target zone.

7. The method of claim 1, wherein the propylene carbonate and the catalyst are introduced into the target zone as a single formulation.

8. The method of claim 1, wherein the catalyst is a metal oxide or a metal nanoparticle.

9. The method of claim 8, wherein the catalyst is the metal nanoparticle and wherein the metal nanoparticle is selected from the group consisting of a platinum-based nanoparticle, nickel-based nanoparticle, copper-based nanoparticle, gold-based nanoparticle, or palladium-based nanoparticle.

10. The method of claim 1, wherein the catalyst is an acid selected from the group consisting of hydrochloric acid, citric acid, acetic acid, formic acid, dodecyl benzene sulfonic acid, succinic acid, adipic acid, glutaric acid, or a mixture thereof.

11. The method of claim 1, wherein the catalyst is a base selected from the group consisting of sodium hydroxide, potassium hydroxide, sodium carbonate, sodium bicarbonate, ammonia, sodium hypochlorite, monoethanolamine, diethanolamine, or a mixture thereof.

12. The method of claim 1, wherein the catalyst is a salt selected from the group consisting of potassium chloride, sodium chloride, ammonium chloride, sodium bromide, cobalt acetate, quaternary ammonium salt, phosphonium salt, or a mixture thereof.

13. The method of claim 1, wherein before the step of introducing the catalyst into the target zone, the method further comprises the step of loading the catalyst onto a surface of a support or within one or more pores of a porous support.

14. The method of claim 1, further comprising the step of injecting the surfactant into the target zone before, after, or simultaneous with the step of introducing the propylene carbonate into the target zone.

15. A method of generating $CO_2$ gas in situ for a treatment objective, the method comprising:

adsorbing a catalyst onto an adsorbent matrix to create a catalyst-loaded matrix;

introducing propylene carbonate into a target zone at a wellbore;

introducing the catalyst-loaded matrix into the target zone, wherein the catalyst desorbs from the catalyst-loaded matrix to decompose the propylene carbonate at the target zone to produce the $CO_2$ gas, wherein the propylene carbonate would be stable within the target zone absent the catalyst; and performing the treatment objective within the target zone using the $CO_2$ gas, wherein the treatment objective is selected from the group consisting of fracturing, performing an acid stimulation treatment, generating drilling foam, and conducting an enhanced oil recovery operation.

16. The method of claim 15, further comprising the step of covering at least a portion of the surface of the catalyst-loaded matrix with a coating prior to the step of introducing the catalyst-loaded matrix into the target zone.

17. A method of generating $CO_2$ gas in situ for a treatment objective, the method comprising:

introducing propylene carbonate into a target zone having a temperature between 250° C. and 400° C.;

introducing a catalyst into the target zone, wherein the catalyst decomposes the propylene carbonate at the target zone to produce the $CO_2$ gas; and performing the treatment objective within the target zone using the $CO_2$ gas, wherein the treatment objective is selected from the group consisting of fracturing, performing an acid stimulation treatment, and generating drilling foam;

wherein the step of introducing the propylene carbonate into the target zone and the step of introducing the catalyst into the target zone occur in any order or simultaneously.

18. The method of claim 17, wherein the catalyst is an acid selected from the group consisting of dodecyl benzene sulfonic acid, succinic acid, adipic acid, glutaric acid, or a mixture thereof.

19. The method of claim 17, wherein the catalyst is a base selected from the group consisting of ammonia, sodium hypochlorite, monoethanolamine, diethanolamine, or a mixture thereof.

20. The method of claim 17, wherein the catalyst is a salt selected from the group consisting of sodium bromide, quaternary ammonium salt, phosphonium salt, or a mixture thereof.

21. The method of claim 17, wherein the step of introducing propylene carbonate into the target zone is performed using a delivery mechanism selected from the group consisting of bullheading, coiled tubing, injection through capillary tubing, and chemical injection plunger.

* * * * *